UNITED STATES PATENT OFFICE.

COULTER W. JONES, OF MIDLAND, MICHIGAN, ASSIGNOR TO THE DOW CHEMICAL COMPANY, OF MIDLAND, MICHIGAN, A CORPORATION OF MICHIGAN.

MANUFACTURE OF BROMATES.

1,343,918.  Specification of Letters Patent.  Patented June 22, 1920.

No Drawing.  Application filed June 25, 1918.  Serial No. 241,747.

*To all whom it may concern:*

Be it known that I, COULTER W. JONES, a citizen of the United States, and a resident of Midland, county of Midland, and State of Michigan, have invented a new and useful Improvement in the Manufacture of Bromates, of which the following is a specification, the principle of the invention being herein explained and the best mode in which I have contemplated applying that principle, so as to distinguish it from other inventions.

The present invention, while relating primarily to the transposition of various bromates by converting the same first to barium bromate and then to a bromate of the desired metal, has more particularly as its object to effect a more complete separation and recovery of various bromates from other salts by thus converting the bromate in such mixture to barium bromate, separating the latter from the mixture and then converting it either into the original or other desired bromate. My improved process is applicable to the transposition of bromates more soluble than barium bromate to barium bromate, which may then be converted into the bromate of any metal whose carbonate or other salt forms a less soluble compound with barium than with the reacting metal.

To the accomplishment of the foregoing and related objects the invention then consists of the steps hereinafter fully described and particularly pointed out in the claims, the following description setting forth in detail certain steps embodying the invention, such described steps constituting, however, but one of various ways in which the principle of the invention may be used.

The conversion of the original bromate into barium bromate is effected by adding barium bromid thereto, the reaction being represented by the following equation:—

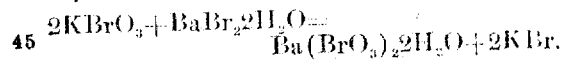

The further conversion of the barium bromate which is thereupon precipitated into the bromate of a desired metal, is effected by adding the carbonate of such metal, whereupon the folloging reaction will occur, assuming sodium carbonate to be added in order to produce sodium bromate:

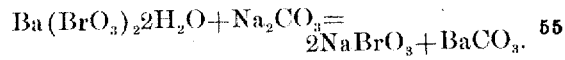

Where magnesium bromate is the desired product, instead of an alkali metal bromate such as the sodium bromate just referred to, magnesium sulfate will be added rather than magnesium carbonate, the reaction then being as follows:—

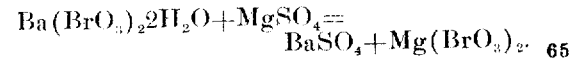

The barium carbonate resulting from the reconversion of the barium bromate into bromate of other desired metal may be again converted into barium bromid for use over again in the first step of the process, this being accomplished by the use of hydrobromic acid as represented by the following equation:—

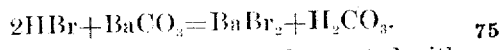

or the barium carbonate may be treated with iron bromid, giving the following reaction:—

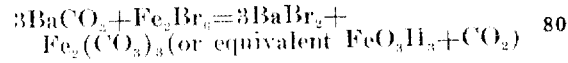

Practically all bromates except silver, mercury, and those of some rare metals, are more soluble than barium bromate, which is soluble only to about 0.3% at zero degrees C., and 5.6% at 100 degs. C. In carrying out the process accordingly a hot concentrated solution is preferably made of the original bromate to be converted or transposed and the barium bromid thereupon slowly added with stirring until the reaction is completed, and additional solid bromate may be added to this reacting solution in order to secure maximum concentration of resulting bromate solution. The solution is then allowed to cool with the result that the barium bromate practically all precipitates out, whereupon it may be separated in any approved fashion.

In the second step the barium bromate thus separated out is placed in a container, water added and the mixture heated, whereupon a solution of sodium carbonate, for example, is added until the reaction is complete. The resulting solution of sodium bromate is then filtered from the precipitate of barium carbonate.

An important use of the process is in effecting a more complete separation and recovery of bromates mixed with bromids and other salts, as for example, to effect a more complete recovery of sodium bromate from liquors containing sodium bromid and sodium bromate, such as are obtained in the manufacture of bromids. The best fractional crystallization of this mixture leaves a liquor containing the salts in the ratio of about 93% sodium bromid to 7% of sodium bromate, but a nearly complete recovery of these salts can be obtained from such residual liquor by the use of the present process.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of recovering a soluble bromate from admixture with other salts, the steps which consist in converting such bromate into relatively insoluble barium bromate; and then separating out such barium bromate, substantially as described.

2. In a method of recovering a soluble bromate from admixture with other salts, the steps which consist in converting such bromate into relatively insoluble barium bromate; separating out such barium bromate; and then converting the same to such original, or other bromate, as desired.

3. In a method of recovering a soluble bromate from admixture with other salts, the steps which consist in adding barium bromid to a solution of such bromate, whereby the latter is converted into relatively insoluble barium bromate; separating out such barium bromate; and then converting the same to such original, or other bromate, as desired.

4. In a method of recovering a soluble bromate from admixture with other salts, the steps which consist in adding barium bromid to a hot, concentrated solution of such bromate, whereby the latter is converted into relatively insoluble barium bromate; cooling the solution; separating out such barium bromate; and then converting the same to such original, or other bromate, as desired.

5. In a method of recovering a soluble bromate from admixture with other salts, the steps which consist in adding barium bromid, with stirring, to a hot, concentrated solution of such bromate, whereby the latter is converted into relatively insoluble barium bromate; cooling the solution; separating such barium bromate; and then adding the same to a solution of the carbonate of the metal of which the bromate is desired.

6. In a method of recovering a soluble bromate from admixture with other salts, the steps which consist in adding barium bromid to a solution of such bromate, whereby the latter is converted into relatively insoluble barium bromate; separating out such barium bromate; reacting between the same and the carbonate of the metal of which the bromate is desired; and converting the barium carbonate thus formed into bromid for use again in the first step.

7. In a method of recovering a soluble bromate from admixture with other salts, the steps which consist in adding barium bromid to a solution of such bromate, whereby the latter is converted into relatively insoluble barium bromate; separating out such barium bromate; reacting between the same and the carbonate of the metal of which the bromate is desired; and treating the barium carbonate thus formed with iron bromid, whereby barium bromid is formed for use again in the first step.

8. The method of recovering a soluble bromate from admixed bromid, which consists in converting such bromate into relatively insoluble barium bromate; separating out such barium bromate; and then reconverting the same to such original bromate.

9. The method of recovering an alkali metal bromate from admixed bromid, which consists in adding barium bromid to a hot concentrated solution of such bromate and bromid, whereby such bromate is converted into relatively insoluble barium bromate; cooling the solution; separating out such barium bromate; and then adding the same to a solution of the carbonate of such alkali metal.

Signed by me, this 20th day of June, 1918.
COULTER W. JONES.